United States Patent [19]

Mihailovic

[11] Patent Number: 5,634,250
[45] Date of Patent: Jun. 3, 1997

[54] HOBBING ACCESSORY FOR VERTICAL MILLING MACHINE

[75] Inventor: Vladan Mihailovic, Long Grove, Ill.

[73] Assignee: 2 M Tool Co., Inc., Chicago, Ill.

[21] Appl. No.: 495,917

[22] Filed: Jun. 28, 1995

[51] Int. Cl.$^6$ .............................. B23F 5/22; B23P 25/02
[52] U.S. Cl. .................. 29/26 A; 29/57; 409/11; 409/144; 409/165; 409/228; 409/235
[58] Field of Search ................ 409/11, 18, 144, 409/165, 168, 226, 228, 229, 235, 240, 242; 29/26 A, 57; 82/131, 152, 171

[56] References Cited

U.S. PATENT DOCUMENTS

| | | | |
|---|---|---|---|
| Re. 22,929 | 10/1947 | Bannow | 90/17 |
| 2,275,291 | 3/1942 | Bannow | 90/17 |
| 2,341,061 | 2/1944 | Rhodes et al. | 409/11 |
| 2,551,359 | 5/1951 | Bannow et al. | 90/44 |
| 2,669,162 | 2/1954 | Arliss | 409/144 |
| 2,734,426 | 2/1956 | Dix | 409/228 |
| 2,963,944 | 12/1960 | Straus | 409/144 |
| 3,267,344 | 8/1966 | McDaniel | 318/39 |
| 3,461,776 | 8/1969 | Hamou et al. | 409/219 |
| 3,835,528 | 9/1974 | Garrett | 29/560 |
| 4,057,893 | 11/1977 | Smith et al. | 409/240 |
| 4,178,537 | 12/1979 | Angst | 318/603 |
| 4,253,050 | 2/1981 | Angst | 409/12 |
| 4,585,377 | 4/1986 | Nozawa et al. | 409/2 |
| 4,587,766 | 5/1986 | Miyatake | 51/95 |
| 4,631,869 | 12/1986 | Miyatake | 51/165.71 |
| 5,037,252 | 8/1991 | Hasegawa et al. | 409/2 |
| 5,260,879 | 11/1993 | Sasaki et al. | 364/474.35 |
| 5,301,405 | 4/1994 | Maker | 29/26 A |
| 5,312,210 | 5/1994 | Lovekamp | 409/11 |

OTHER PUBLICATIONS

Bridgeport Catalog, Aug., 1984, "Attachments and Accessories for Standard Vertical Milling Machines".
Bridgeport Series I Milling Machine Manual No. M-105, "Installation and Maintenance Manual No. M105", dated Jun., 1973.
Section 16.2.1, pp. 16-6-16.6, "Application of Gear Hobbing", Dudley's Gear Handbook by Dennis P. Townsend Lewis Research Center, NASA, Copyright© 1992, 1962 by McGraw-Hill, Inc.

*Primary Examiner*—Daniel W. Howell
*Attorney, Agent, or Firm*—Dressler, Goldsmith, Milnamow, & Katz, Ltd.

[57] ABSTRACT

A hobbing accessory is disclosed for a vertical milling machine of a type comprising a column, a knee mounted to the column so as to be vertically positionable with respect to the column, a saddle mounted to the knee so as to be horizontally positionable with respect to the knee, toward and away from the column, a table mounted to the saddle so as to be horizontally positionable with respect to the saddle, in opposite directions across the column, a head projecting from the column, an arbor mounted operatively to the head and rotatable about a generally vertical axis, and a motor for rotating the arbor about the generally vertical axis. The hobbing accessory comprises a hob mountable to the arbor so as to be conjointly rotatable with the arbor about the generally vertical axis, an encoder mountable to the head for encoding rotational positions of the hob with respect to a fixed frame of reference, as the hob is rotated about the generally vertical axis, and for producing signals reflecting the encoded positions, a rotatable chuck, which is mountable to the table so as to be conjointly positionable with the table, for mounting a workpiece so as to permit the workpiece to be conjointly rotated with the chuck about a generally horizontal axis, a motor for rotating the chuck, and a controller responsive to signals produced by the encoder for controlling the motor for rotating the chuck.

8 Claims, 2 Drawing Sheets

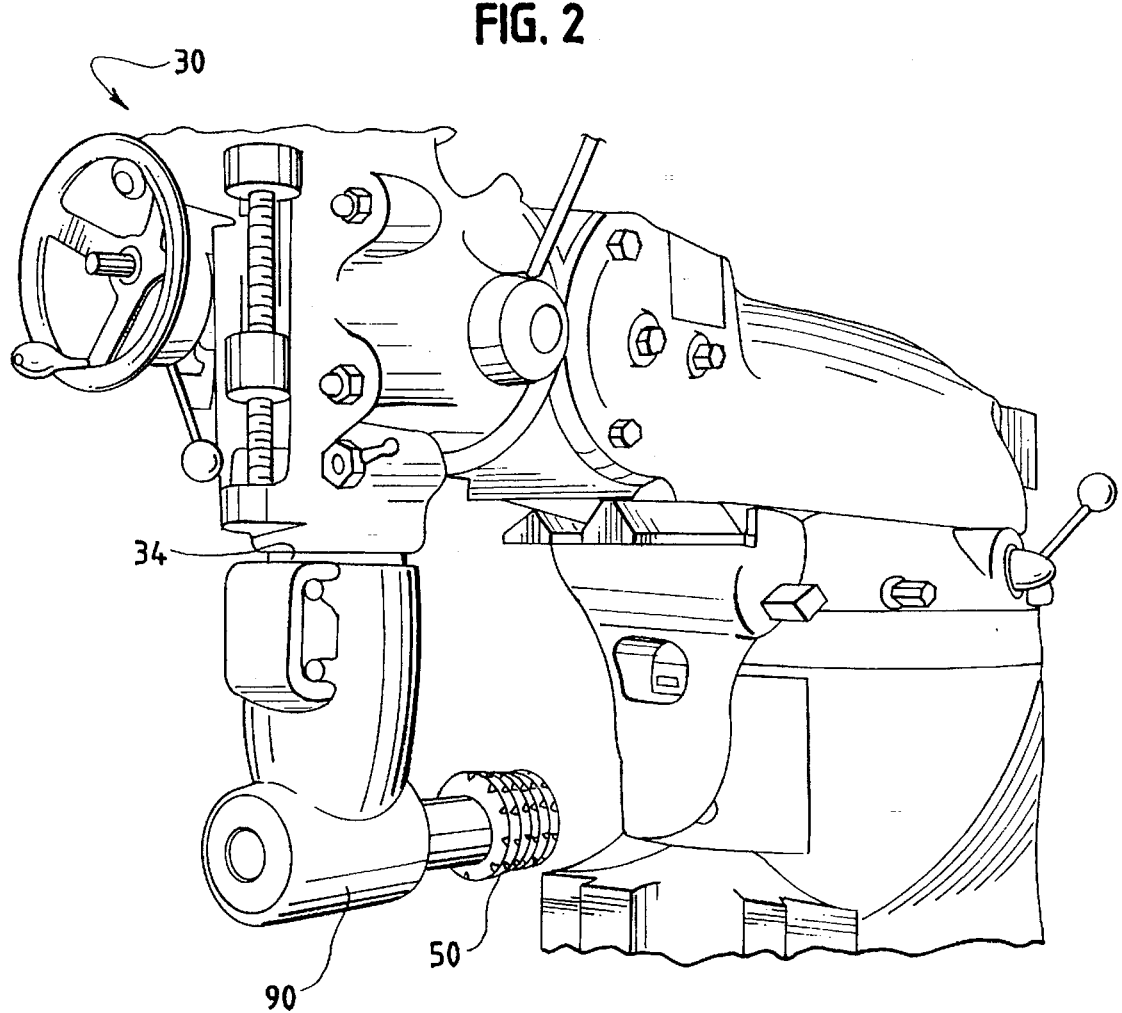

5,634,250

HOBBING ACCESSORY FOR VERTICAL MILLING MACHINE

TECHNICAL FIELD OF THE INVENTION

This invention pertains to a novel accessory for a vertical milling machine of a type in widespread use. The novel accessory enables spur gears, helical gears, splines, and other workpieces to have external teeth to be hobbed on the vertical milling machine.

BACKGROUND OF THE INVENTION

As explained in Chapter 16.2 ("Gear Hobbing") of *Dudley's Gear Handbook*, Second Edition, McGraw-Hill, Inc., New York, N.Y. (1992) at pages 16.6 et seq., almost any external tooth form that is spaced uniformly about a center can be hobbed. Usually, in generation of a gear tooth by a hobbing process, a cutting tool and a workpiece rotate in a constant relationship between their rotational speeds while the cutting tool is fed into the workpiece. The cutting tool, which is known as a hob, is a fluted worm having radially relieved teeth arranged in a helical pattern.

Heretofore, specialized hobbing machines have been employed, which tend to be very expensive. Generally, a hobbing machine of an older type employs a gear train with changeable gears to maintain the constant relationship between the rotational speeds of the hob and the workpiece, whereas a hobbing machine of a newer type employs computer numerical control (CNC) and a so-called electronic gear box (EGB) to maintain the constant relationship therebetween.

Many machine shops have vertical milling machines of a type comprising a column, a knee mounted to the column so as to be vertically positionable with respect to the column, a saddle mounted to the knee so as to be horizontally positionable with respect to the knee, toward and away from the column, a table mounted to the saddle so as to be horizontally positionable with respect to the saddle, in opposite directions across the column, a head projecting from the column, an arbor mounted operatively to the head and rotatable about a generally vertical axis, and a motor for rotating the arbor about the generally vertical axis. Vertical milling machines of this type are available from various manufacturers including Bridgeport Machines of Bridgeport, Conn.

In many machine shops, it would be very useful if a vertical milling machine of the type noted above could be somehow adapted to perform the hobbing process.

SUMMARY OF THE INVENTION

This invention provides a hobbing accessory for a vertical milling machine of the type mentioned above. Broadly, the hobbing accessory comprises a hob, an encoder, a rotatable chuck, and a motor for rotating the chuck, as described below.

The hob is mountable to the arbor so as to be conjointly rotatable with the arbor about the generally vertical axis. The encoder is arranged for encoding rotational positions of the hob with respect to a fixed frame of reference, as the hob is rotated about the generally vertical axis, and for producing signals reflecting the encoded positions. The chuck is mountable to the table so as to be conjointly positionable with the table and is provided for mounting a workpiece so as to permit the workpiece to be conjointly rotated with the chuck about a generally horizontal axis. The motor for rotating the chuck is controlled via signals produced by the encoder.

Preferably, the motor for driving the chuck and the chuck are mountable, as an assembly, to the table so as to be conjointly positionable with the table. Preferably, the hobbing accessory further comprises a controller responsive to signals produced by the encoder for controlling the motor for driving the chuck. Optionally, the hobbing accessory may include a right angle adapter for rotating the hob about an axis at a right angle to the generally vertical axis.

This invention may be also embodied in a vertical milling machine of the type noted above, as equipped with the hobbing accessory noted above.

These and other objects, features, and advantages of this invention are evident from the following description of a preferred embodiment of this invention with reference to the accompanying drawings.

BRIEF DESCRIPTION OF THE DRAWINGS

FIG. 2 is a slightly enlarged, partly fragmentary, perspective view of a vertical milling machine equipped with a hobbing accessory including a right angle adapter according to an alternative embodiment.

DETAILED DESCRIPTION OF THE PREFERRED EMBODIMENT

Figure 1:
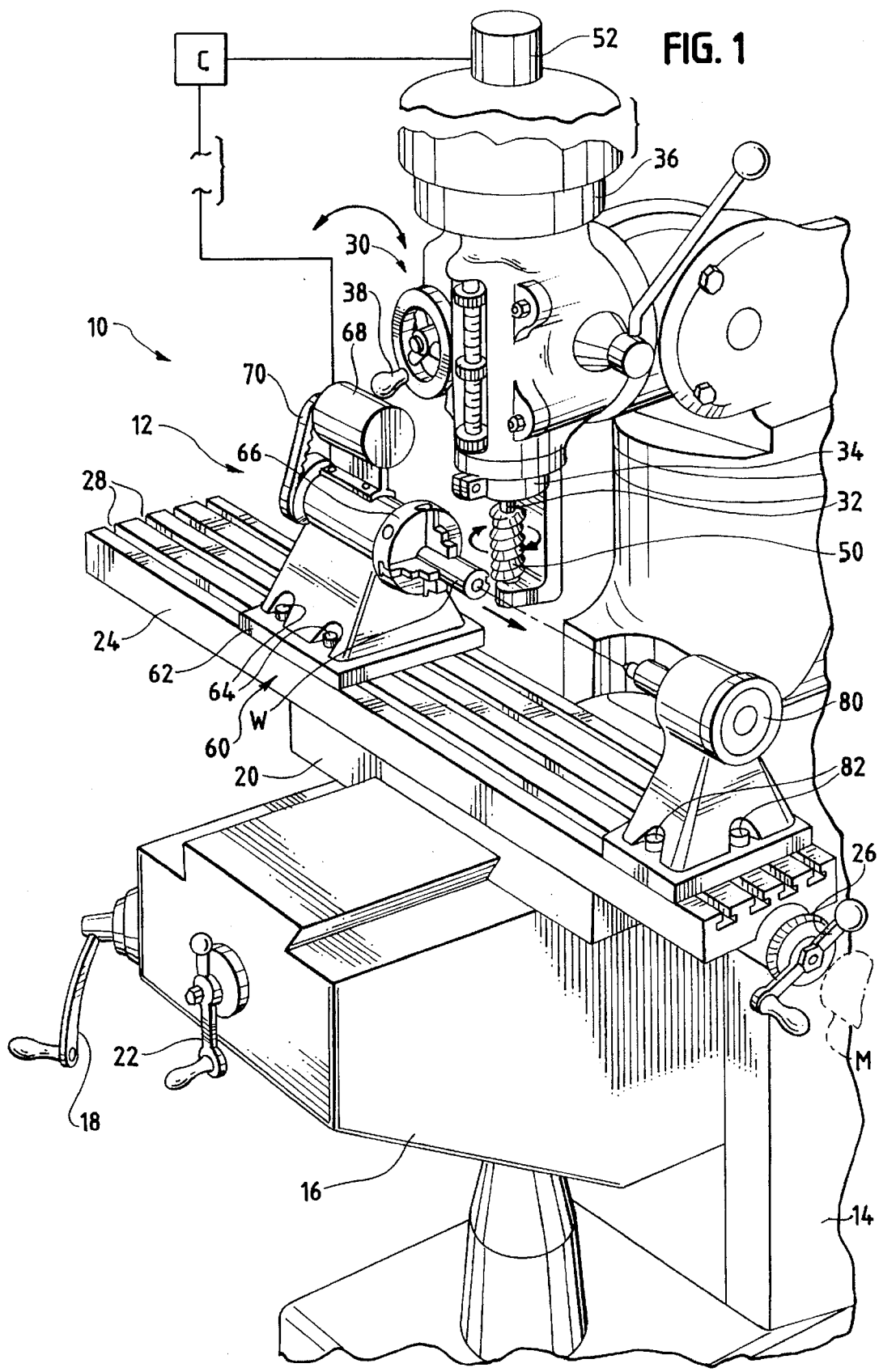
FIG. 1 is a partly fragmentary, perspective view of a vertical milling machine equipped with a hobbing accessory according to a preferred embodiment, as described above.

As shown in, a vertical milling machine 10 of the type noted above is equipped with a hobbing accessory 12 according to a preferred embodiment of this invention. The hobbing accessory 12 adapts the vertical milling machine 10 to perform the hobbing process. Except for the hobbing accessory 12, the vertical milling machine 10 is similar to vertical milling machines available commercially from Bridgeport machines, supra.

Thus, the vertical milling machine 10 comprises a column 14, a knee 16 mounted to the column 14 so as to be vertically positionable with respect to the column 14 by means of a positioning mechanism employing a hand crank 18, a saddle 20 mounted to the knee so as to be horizontally positionable with respect to the knee 16, toward and away from the column 14, by means of a positioning mechanism employing a hand crank 22, and a table 24 mounted to the saddle 20 so as to be horizontally positionable with respect to the saddle 20, in opposite directions across the column 14, by means of a positioning mechanism employing a hand crank 26. The table 24 is provided with T-slots 28 for mounting workholders and accessories via T-bolts or T-nuts.

Also, the vertical milling machine 10 comprises a head 30 projecting from the column 14, an arbor 32 mounted operatively to the head 30 via a quill 34 and rotatable about a generally vertical axis, and a motor 36 for rotating the arbor 32 about the generally vertical axis. The head 30 can be angularly adjusted with respect to the column over a limited range of angular adjustments, whereby the generally vertical axis noted above can be angularly inclined over the limited range with respect to a truly vertical axis, in a plane parallel to the directions of positioning of the table 24 with respect to the saddle 20, by means of an adjusting mechanism employing a hand crank 38.

Except as specified herein, other features of the vertical milling machine 10 are known to persons having ordinary skill in the art of vertical milling machines and are outside the scope of this invention.

The hobbing accessory 20 comprises a hob 50 mounted to the arbor 32 so as to be conjointly rotatable with the arbor 32 about the generally vertical axis noted above. The hobbing accessory 20 also comprises a digital encoder 52 mounted to the head 30 and coupled to the arbor 32 for encoding rotational positions of the hob 50 with respect to a fixed frame of reference, as the hob 50 is rotated about the generally vertical axis, for producing digital signals reflecting the encoded positions. Suitable encoders are available commercially from Heidenhain Corporation of Schaumburg, Ill.

The hobbing accessory 12 further comprises an assembly 60 including a base 62 mounted to the table 24 via T-bolts 64, which coact with some of the T-slots 28 of the table 24, so as to be conjointly positionable with the table 24 when the table 24 is positioned with respect to the saddle 20. The assembly 60 also includes a rotatable chuck 66 for mounting a workpiece W so as to permit the workpiece W to be conjointly rotated with the chuck 80 about a generally horizontal axis. The assembly 60 also includes a servomotor 68 connected to the chuck 66 via a timing belt 70 for rotating the chuck 66 about the generally horizontal axis.

Optionally, as shown, the hobbing accessory 12 also comprises a tailstock mechanism 80 mounted to the table 24 via T-bolts 82. The tailstock mechanism 12 is used with longer workpieces but not with shorter workpieces, such as the workpiece W shown in FIG. 1.

As the workpiece W is being hobbed, the table 24, the assembly 60, and the workpiece W are fed manually by means of the positioning mechanism including the hand crank 26. If the vertical milling machine 10 is equipped with a motor M (see FIG. 1) for positioning the table 24, the same motor M can be instead used to feed the table 24, the assembly 60, and the workpiece W. The assembly 60 can be either mounted to the table 24 with the workpiece W on a given side of the hob 50, as shown, for conventional cutting or with the workpiece W on the other side of the hob 50 for climb cutting. The hobbing accessory 12 further comprises a microprocessor, computer, or other controller C, which is arranged to receive the digital signals from the digital encoder 52 and to control the servomotor 68 for rotating the chuck 66 in response to the received signals. If the vertical milling machine 10 is equipped with the motor M noted above for positioning the table 24, the controller C can be also used to control the same motor M for feeding the table 24, the assembly 60, and the workpiece W.

Optionally, as shown in FIG. 2, the hobbing accessory 12 may be also provided with a right angle adapter 90 for rotating the hob 50 about an axis at a right angle to the generally vertical axis noted above. Suitable right angle adapters are available commercially from Bridgeport Machines, supra.

Various modifications may be made in the preferred embodiment described above without departing from the scope and spirit of this invention.

I claim:

1. A hobbing accessory for a vertical milling machine of a type comprising a column, a knee mounted to the column so as to be vertically positionable with respect to the column, a saddle mounted to the knee so as to be horizontally positionable with respect to the knee, toward and away from the column, a table mounted to the saddle so as to be horizontally positionable with respect to the saddle, in opposite directions across the column, a head projecting from the column, an arbor mounted operatively to the head and rotatable about a generally vertical axis, and means including a motor for rotating the arbor about the generally vertical axis, the hobbing accessory comprising a hob mountable to the arbor so as to be conjointly rotatable with the arbor about the generally vertical axis, means including an encoder for encoding rotational positions of the hob with respect to a fixed frame of reference, as the hob is rotated about the generally vertical axis, and for producing signals reflecting the encoded positions, means including a rotatable chuck, which is mountable to the table so as to be conjointly positionable with the table, for mounting a workpiece so as to permit the workpiece to be conjointly rotated with the chuck about a generally horizontal axis, and means including a motor, which is controlled via signals produced by the encoding means, for rotating the chuck.

2. The hobbing accessory of claim 1 wherein the motor for driving the chuck and the chuck are mountable, as an assembly, to the table so as to be conjointly positionable with the table.

3. The hobbing accessory of claim 1 further comprising means responsive to signals produced by the encoder for controlling the motor for rotating the chuck.

4. The hobbing accessory of claim 1 further comprising means including a right angle adapter for rotating the hob about an axis at a right angle to the generally vertical axis.

5. A vertical milling machine having a hobbing capability and comprising a column, a knee mounted to the column so as to be vertically positionable with respect to the column, a saddle mounted to the knee so as to be horizontally positionable with respect to the knee, toward and away from the column, a table mounted to the saddle so as to be horizontally positionable with respect to the saddle, in opposite directions across the column, a head projecting from the column, an arbor mounted operatively to the head and rotatable about a generally vertical axis, means including a motor for rotating the arbor about the generally vertical axis, and a hobbing accessory comprising a hob mounted to the arbor so as to be conjointly rotatable with the arbor about the generally vertical axis, means including an encoder for encoding rotational positions of the hob with respect to a fixed frame of reference, as the hob is rotated about the generally vertical axis, and for producing signals reflecting the encoded positions, means including a rotatable chuck, which is mounted to the table so as to be conjointly positionable with the table, for mounting a workpiece so as to permit the workpiece to be conjointly rotated with the chuck about a generally horizontal axis, and means including a motor, which is controlled via signals produced by the encoding means, for rotating the chuck.

6. The vertical milling machine of claim 5 wherein the motor for driving the chuck and the chuck are mounted, as an assembly, to the table so as to be conjointly positionable with the table.

7. The vertical milling machine of claim 1 further comprising means responsive to signals produced by the encoder for controlling the motor for rotating the chuck.

8. The vertical milling machine of claim 1 further comprising means including a right angle adapter for rotating the hob about an axis at a right angle to the generally vertical axis.

* * * * *